(12) United States Patent
Hoehn et al.

(10) Patent No.: US 11,279,202 B2
(45) Date of Patent: Mar. 22, 2022

(54) ARRANGEMENT FOR SEALING FUNCTIONAL UNIT INTERFACES

(71) Applicant: MAHLE International GmbH, Stuttgart (DE)

(72) Inventors: Garrett Wade Hoehn, Kenmore, NY (US); Jeremy Michael Fischer, Appleton, NY (US)

(73) Assignee: MAHLE International GmbH, Stuttgart (DE)

( * ) Notice: Subject to any disclaimer, the term of this patent is extended or adjusted under 35 U.S.C. 154(b) by 535 days.

(21) Appl. No.: 16/398,803

(22) Filed: Apr. 30, 2019

(65) Prior Publication Data
US 2020/0346515 A1 Nov. 5, 2020

(51) Int. Cl.
*B60H 1/00* (2006.01)
*F16L 5/10* (2006.01)

(52) U.S. Cl.
CPC ..... *B60H 1/00557* (2013.01); *B60H 1/00528* (2013.01); *B60H 1/00592* (2013.01); *F16L 5/10* (2013.01); *B60H 2001/00635* (2013.01)

(58) Field of Classification Search
CPC .......... B60H 1/00557; B60H 1/00528; B60H 1/00592; B60H 2001/00635; F16L 5/10; F16J 15/02; F16J 15/021; F16J 15/022; F16J 15/50
See application file for complete search history.

(56) References Cited

U.S. PATENT DOCUMENTS

| | | | |
|---|---|---|---|
| 10,864,795 B2 * | 12/2020 | Kim .......................... | F16L 5/02 |
| 2019/0118612 A1 * | 4/2019 | Ferrer ................ | B60H 1/00528 |
| 2019/0315189 A1 * | 10/2019 | Kim ................... | B60H 1/00571 |

* cited by examiner

*Primary Examiner* — Gilbert Y Lee
(74) *Attorney, Agent, or Firm* — Dickinson Wright PLLC

(57) ABSTRACT

An arrangement for sealing functional unit interfaces includes a functional unit, an interface, and a sealing element. The interface has a first main surface, a second main surface, and an opening. The second main surface has a clamping section enclosing the opening. The functional unit has a front face with a counter-clamping section opposite the clamping section. The sealing element has a sealing body and a support element at least partially arranged within the sealing body. The sealing body has a first section clamped between the clamping section and the counter-clamping section. The opening is closed by a second section of sealing body, which is at least partially arranged between the opening and the front face. The support element is partially arranged in the first section and partially in the second section of the sealing body. The support element and the sealing body consist of different materials.

17 Claims, 5 Drawing Sheets

ARRANGEMENT FOR SEALING FUNCTIONAL UNIT INTERFACES

TECHNICAL FIELD

The present disclosure relates to an arrangement for sealing functional unit interfaces in a vehicle. Additionally, the present disclosure relates to a sealing element for such an arrangement.

BACKGROUND

Functional unit interfaces provide at least one partition which at least partially separates a first space area and a second space area of a vehicle interior. A function unit being arranged in the second space area of a vehicle may be connected for their operation via lines with components disposed in first space area. Thus, the functional unit interface provides an opening through which at least one line extends.

In order to separate the first space area and the second space area fluidically, a molded sealing is arranged between the functional unit interface and the functional unit. A part of such a molded sealing is at least partially clamped by a clamping force between a clamping section of the functional unit interfaces and a counter-clamping section of the function unit. A lack of seal compression may lead to air or water leaks between the first space area and the second space area.

These types of molded seals for sealing around functional units, which may comprise an expansions valve or a heater pipe, typically are made of foam or rubber material. Evaporator frame seals are known which are enhanced with a rubber overmold. These molded seals have a low stiffness resulting in a sufficient seal compression in the vicinity of the limitation contour of the opening, but in an insufficient seal compression in the central area of the opening where a sufficient sealing is required and critical for a reliable operation.

SUMMARY

Throughout the present disclosure, the word "or" is used in an inclusive sense, meaning that either one or both of the mentioned alternatives may be implemented.

The present disclosure is based on the task of specifying an arrangement for sealing functional unit interfaces as well as a sealing element for such an arrangement with improved mechanical strength or mechanical stiffness. The present disclosure is based on the general concept that a sealing element comprises an imbedded structure which distributes a sealing force or clamping force along the sealing element.

In a vehicle, functional units may be arranged in a vehicle interior, the functional units have to be connected via lines for the operation thereof to components which are arranged in an engine compartment of the vehicle. For example, fluid lines which conduct coolant or cooling water have to be passed from an a heating, ventilation and air conditioning (HVAC) unit which may be positioned in the vehicle interior to the engine compartment, as parts of the cooling devices, for example, are arranged in the vicinity of the engine. Generally, the engine compartment may be separated from the vehicle interior by a partition which has at least one opening in the form of a through-hole, through which the fluid lines which transport the coolant or the cooling water may be passed.

The innovative arrangement for sealing functional unit interfaces in a vehicle comprises a functional unit and a functional unit interface having at least one partition. The functional unit interface or the partition may form a foreign object damage (FOD) shield. The functional unit interface or the partition may be partially formed of a metallic material. The functional unit interface may be a part of a vehicle or arranged within a vehicle.

The partition at least partially separates a first space area and a second space area. The partition has a first main surface, a second main surface and at least one opening. The opening may have a trapezoidal shape with rounded corners. The second main surface has a clamping section enclosing the opening. The second space area may be a vehicle interior. The first space area may be an engine compartment of the vehicle The first main surface is arranged in the first space area and the second main surface is arranged in the second space area. At least one functional unit is arranged at least partially in the second space area. A part of the functional unit may extend from the second space area to the first space area. Such a part of the functional unit may extend through a sealing body opening. The functional unit may be a heating, ventilation and air conditioning (HVAC) unit. The functional unit may comprise an expansion valve or a thermostatic expansion valve or at least one heater pipe. Such an expansion valve or a thermostatic expansion valve or at heater pipe may extend though an appropriate sealing body opening.

The functional unit has a front face which is arranged at least partially opposite the opening of the functional unit interface. The front face has a counter-clamping section being substantially arranged opposite the clamping section. At least one line is passed from a first space area to the functional unit. This line may be a fluid line.

The arrangement for sealing functional unit interfaces comprises at least one sealing element with at least one sealing body and at least one support element. The seal element may be a static sealing or a molded sealing. The sealing element may have a trapezoidal shape with rounded corners. The sealing body has a first section which encloses a second section of the sealing body. The first section of the sealing body and the second section of the sealing body may be formed as a single piece or as a one piece. The first section may be enclosed by a collar section. The collar section may be enclosed by a collard edge section. The first section of the sealing body, the second section of the sealing, the collar section of the sealing body and the collard edge section of the sealing body may be formed as a single piece or as a one piece. The collar section may extend primarily axially from the first section of the sealing body and the collard edge section may extend primarily radially from the first section of the sealing body.

At least the first section of the sealing body is at least partially clamped between the clamping section and the counter-clamping section. The opening is closed by the second section of sealing body which is at least partially arranged between the opening and the front face.

The second section of the sealing body may provide at least one sealing body opening through which a line, particularly a fluid line or a part of an expansion valve unit, may be passed.

The support element is at least partially arranged within the sealing body. The support element may be inserted into the sealing body. The sealing element or the sealing body may comprise at least one integrally molded in or molded in support element. The support element may be at least partially overmolded. The support element may be at least partially overmolded by the sealing body or by the sealing body material. The support element may be an insert molded part of the sealing element.

The support element may form an imbedded structure of the sealing element.

Since a part of the support element is arranged outside of the sealing body, it is possible to verify if the support element is correctly inserted or molded in or overmolded. The support element may be formed as a single piece or as a one piece.

At least a first section of the support element is at least partially arranged in the first section of the sealing body and at least a second section of the support element is at least partially arranged in the second section of the sealing body. A part of the second section of the support element may be arranged outside of the sealing body. A part of the second section of the support element may be arranged outside of the sealing body and may protrude partially in the first space area.

The support element may have several first sections which may be spaced apart and which may be at least partially arranged in the first section of the sealing body. These first sections may be connected by at least one second section or several second sections of the support element which are at least partially arranged in the second section of the sealing body.

At least a subsection of the second section of sealing body is clamped between the support element and the front face. The support element is made of a first material and the sealing body is made of a second material. The first material and the second material may be different. The support element or the first material may have a Young modulus value greater than the Young modulus value of the sealing body or of the second material. The Young modulus value of the support element or the first material may be at least 10 times or at least 100 times or at least 1000 times higher than the Young modulus value of the sealing body or of the second material.

The support element distributes the sealing force or clamping force along the sealing element providing an in improved sealing function. A molded-in or inserted support element located in the sealing element or sealing body ensures a proper assembly, maintains current seals sealing integrity, and enhances the sealing function. Additionally, the support element is at least partially protected from exposure to the under hood environment of the first space area.

The first section of the sealing body may be defined as the part of the sealing body which is clamped between clamping section and the counter-clamping section. The first section of the sealing body may be defined as the part of the sealing body which is in contact with the clamping section and the counter-clamping section.

According to a further example of the solution according to the present disclosure, the at least one partition is at least partially made of metallic material, the at least one sealing body is at least partially made of foam-like or rubber material, the at least one support element is at least partially made of solid material. The at least one sealing body may be at least partially made of plastic foam-like material, particularly thermoplastic foam-like material. Plastic foam-like material may be foam-like material in a solidified form being formed by polymer material. Thermoplastic foam-like material may be foam-like material in a solidified form being formed by thermoplastic material. The sealing body may be made of made foamed polyurethanes, particularly of viscoelastic foamed polyurethanes. The at least one support element may be at least partially made of plastic material, particularly thermoplastic material. The at least one partition may be at least partially made of sheet metal.

According to a further example of the solution according to the present disclosure, the functional unit is at least partially a HVAC module and the at least one line is a fluid line. The fluid line may be formed to conduct coolant or cooling water.

According to a further example of the solution according to the present disclosure, the HVAC module comprises an expansion valve unit which is at least partially sealed by the sealing element. The expansion valve unit may comprise an expansion valve or a thermostatic expansion valve. Such an expansion valve or a thermostatic expansion may extend though an appropriate sealing body opening. Such an expansion valve or a thermostatic expansion may partially extend into the first space area.

According to a further example of the solution according to the present disclosure, the at least one support element has a generally Y-shaped cross-section transverse to a longitudinal extension direction of the support element. The support element with Y-shaped cross-section may have three legs of which one leg may form a longitudinal element of the support element being arranged at least partially outside of the sealing body. Two legs of the support element with Y-shaped cross-section may be arranged entirely or mostly in the sealing body. A Y-shaped cross-section may improve the mechanical resistance or stiffness of the support element resulting in an improved distribution of the sealing force or clamping force along the sealing element.

According to a further example of the solution according to the present disclosure, the Y-shaped support element comprises a reinforcement structure being at least partially arranged between two legs of the support element, the reinforcement structure being arranged within the sealing body. The reinforcement structure may form ribbings, particularly X ribbings. The reinforcement structure may improve the mechanical resistance or stiffness of the support element resulting in an improved distribution of the sealing force or clamping force along the sealing element.

According to a further example of the solution according to the present disclosure, the at least one support element has at least one positioning pin being at least partially arranged outside of the sealing body. The support element may have two positioning pins which may be spaced apart. The support element may have two positioning pins which may be spaced apart along a longitudinal extension direction of the support element. The positioning pin or positioning pins may be used to locate or to arrange the support element in a mold for sealing body. The positioning pin or positioning pins may be used to locate or to arrange or to insert the support element in the sealing body. If the support element is in the sealing body, the positioning pin or positioning pins may be used to locate or to arrange the sealing element in a simple way.

According to a further example of the solution according to the present disclosure, wherein the at least one support element is substantially mirror symmetric to a transverse axis of the support element which is aligned transverse to a longitudinal extension direction of the support element. The positioning or arrangement of the support element in a mold for sealing body is less prone to failures. The installation or insertion of the support element the sealing body is less prone to failures.

According to a further example of the solution according to the present disclosure, the at least one support element comprises or forms a frame unit with at least a first frame section and a second frame section. The first frame section and the second frame section are spaced apart. The first frame section defines a first frame opening and the second section defines a second frame opening. The first frame section or the second frame section or the first frame opening or the second frame opening may be rectangular or trapezoidal shaped. The first frame section or the second frame section or the first frame opening or the second frame opening may be rectangular or trapezoidal shaped with rounded corners.

The first frame opening is substantially arranged opposite the second frame opening. The first frame section and a second frame section are connected by at least one connection section. The connection section has a generally V-shaped cross-section transverse to a longitudinal extension direction of the connection section. A first leg of the V-shaped connection section is connected to the first frame section and a second leg of the V-shaped connection section is connected to the second frame section. An end of the first leg and end of the second leg on the opposite side of the first frame section or second frame section may be connected by a head section. The head section may be arranged transversely to the first frame section or second frame section.

The connection section may comprise a reduced material thickness in a section between the first leg and the first frame section. The connection section may comprise a reduced material thickness in a section between the second leg and the second frame section. The connection section may comprise a reduced material thickness in a section between the first leg and the head section. The connection section may comprise a reduced material thickness in a section between the second leg and the head section. The section with reduced material thickness may be used to provide a spring-like behavior of the connection section.

The frame unit may comprise several connection sections which are arranged at a distance in the circumferential direction of the first frame opening or the second frame opening.

If the first frame section and the second frame section are compressed by a clapping force, at least a part of the camping force may be redirected. The clamping force may be partially transferred to connection sections, particularly to the head section. Thus, at least a part of the camping force may be redirected in a radial direction which may be substantially oriented transverse to the camping force acting on the first frame section and the second frame section.

The first frame section, the second frame section and the connection section are at least partially arranged within the sealing body.

The frame unit may be inserted into the sealing body. The sealing element or the sealing body may comprise at least one integrally molded in or molded in frame unit. The frame unit may be at least partially overmolded. The frame unit may be at least partially overmolded by the sealing body or by the sealing body material. The frame unit may be an insert molded part of the sealing element.

At least a part of the frame unit may be arranged in the first section of the sealing body. At least a part of connection section may be arranged in the second section of the sealing body.

According to a further example of the solution according to the present disclosure, the functional unit comprises at least one expansion valve unit which is at least partially arranged within the first frame opening and the second frame opening. The expansion valve unit may comprise an expansion valve or a thermostatic expansion valve. The frame unit is used to create a radial sealing or clamping force around the expansion valve to improve sealing to a typically difficult shape to seal against.

Furthermore the present disclosure relates to a sealing element for an inventive arrangement as described above. The present disclosure is based on the general concept that a sealing element may comprise an imbedded structure which distributes a sealing force or clamping force along the sealing element.

The sealing element comprises at least one sealing body and at least one support element. The seal element may be a static sealing or a molded sealing. The sealing element may have a trapezoidal shape with rounded corners. The sealing body has a first section which encloses a second section of the sealing body. The first section of the sealing body and the second section of the sealing body may be formed as a single piece or as a one piece. The first section may be enclosed by a collar section. The collar section may be enclosed by a collar edge section. The first section of the sealing body, the second section of the sealing body, the collar section of the sealing body and the collar edge section of the sealing body may be formed as a single piece or as a one piece. The collar section may extend primarily axially from the first section of the sealing body and the collard edge section may extend primarily radially from the first section of the sealing body.

At least the first section of the sealing body may be at least partially clamped between the clamping section and the counter-clamping section of the arrangement described above. The opening of the arrangement described above may be closed by the second section of sealing body which may be at least partially arranged between the opening and the front face of the arrangement described above.

The second section of the sealing body may provide at least one sealing body opening through which a line, particularly a fluid line or a part of an expansion valve unit, may be passed.

The support element is at least partially arranged within the sealing body. The support element may be inserted into the sealing body. The sealing element or the sealing body may comprise at least one integrally molded in or molded in support element. The support element may be at least partially overmolded. The support element may be at least partially overmolded by the sealing body or by the sealing body material. The support element may be an insert molded part of the sealing element.

The support element may form an imbedded structure of the sealing element.

Since a part of the support element is arranged outside of the sealing body, it is possible to verify if the support element is correctly inserted or molded in or overmolded. The support element may be formed as a single piece or as a one piece.

At least a first section of the support element is at least partially arranged in the first section of the sealing body and at least a second section of the support element is at least partially arranged in the second section of the sealing body. A part of the second section of the support element may be arranged outside of the sealing body. A part of the second section of the support element may be arranged outside of the sealing body and may protrude partially in the first space area.

The support element may have several first sections which may be spaced apart and which may be at least partially arranged in the first section of the sealing body. These first sections may be connected by at least one second section or several second sections of the support element which are at least partially arranged in the second section of the sealing body.

At least a subsection of the second section of sealing body may be clamped between the support element and the front face of the arrangement described above. The support element is made of a first material and the sealing body is made of a second material. The first material and the second material may be different. The support element or the first material may have a Young modulus value greater than the Young modulus value of the sealing body or of the second material. The Young modulus value of the support element or the first material may be at least 10 times or at least 100 times or at least 1000 times higher than the Young modulus value of the sealing body or of the second material.

The support element distributes the sealing force or clamping force along the sealing element providing an in improved sealing function. A molded-in or inserted support element located in the sealing element or sealing body ensures a proper assembly, maintains current seals sealing integrity, and enhances the sealing function. Additionally, the support element is at least partially protected from exposure to the under hood environment of the first space area of the arrangement described above.

The first section of the sealing body may be defined as the part of the sealing body which is or may be clamped between clamping section and the counter-clamping section. The first section of the sealing body may be defined as the part of the sealing body which is or may be in contact with the clamping section and the counter-clamping section.

According to a further example of the solution according to the present disclosure, the at least one sealing body is at least partially made of foam-like or rubber material and the at least one support element is at least partially made of solid material.

The at least one sealing body may be at least partially made of plastic foam-like material, particularly thermoplastic foam-like material. Plastic foam-like material may be foam-like material in a solidified form being formed by polymer material. Thermoplastic foam-like material may be foam-like material in a solidified form being formed by thermoplastic material. The sealing body may be made of made foamed polyurethanes, particularly of viscoelastic foamed polyurethanes. The at least one support element may be at least partially made of plastic material, particularly thermoplastic material. The at least one partition may be at least partially made of sheet metal.

According to a further example of the solution according to the present disclosure, the at least one support element has a generally Y-shaped cross-section transverse to a longitudinal extension direction of the support element. The support element with Y-shaped cross-section may have three legs of which one leg may form a longitudinal element of the support element being arranged at least partially outside of the sealing body. Two legs of the support element with Y-shaped cross-section may be arranged completely or mostly in the sealing body. A Y-shaped cross-section may improve the mechanical resistance or stiffness of the support element resulting in an improved distribution of the sealing force or clamping force along the sealing element.

According to a further example of the solution according to the present disclosure, the Y-shaped support element comprises a reinforcement structure being at least partially arranged between two legs of the support element, the reinforcement structure being arranged within the sealing body. The reinforcement structure may form ribbings, particularly X ribbings. The reinforcement structure may improve the mechanical resistance or stiffness of the support element resulting in an improved distribution of the sealing force or clamping force along the sealing element.

According to a further example of the solution according to the present disclosure, the at least one support element has at least one positioning pin being at least partially arranged outside of the sealing body. The support element may have two positioning pins which may be spaced apart. The support element may have two positioning pins which may be spaced apart along a longitudinal extension direction of the support element. The positioning pin or positioning pins may be used to locate or to arrange the support element in a mold for sealing body. The positioning pin or positioning pins may be used to locate or to arrange or to insert the support element in the sealing body. If the support element is in the sealing body, the positioning pin or positioning pins may be used to locate or to arrange the sealing element in a simple way.

According to a further example of the solution according to the present disclosure, the at least one support element is substantially mirror symmetric to a transverse axis of the support element which is aligned transverse to a longitudinal extension direction of the support element. The positioning or arrangement of the support element in a mold for sealing body is less prone to failures. The installation or insertion of the support element the sealing body is less prone to failures.

According to a further example of the solution according to the present disclosure, the at least one support element comprises or forms a frame unit with at least a first frame section and a second frame section. The first frame section and the second frame section are spaced apart. The first frame section defines a first frame opening and the second section defines a second frame opening. The first frame section or the second frame section or the first frame opening or the second frame opening may be rectangular or trapezoidal shaped. The first frame section or the second frame section or the first frame opening or the second frame opening may be rectangular or trapezoidal shaped with rounded corners.

The first frame opening is substantially arranged opposite the second frame opening. The first frame section and a second frame section are connected by at least one connection section. The connection section has a generally V-shaped cross-section transverse to a longitudinal extension direction of the connection section. A first leg of the V-shaped connection section is connected to the first frame section and a second leg of the V-shaped connection section is connected to the second frame section. An end of the first leg and end of the second leg on the opposite side of the first frame section or second frame section may be connected by a head section. The head section may be arranged transversely to the first frame section or second frame section.

The connection section may comprise a reduced material thickness in a section between the first leg and the first frame section. The connection section may comprise a reduced material thickness in a section between the second leg and the second frame section. The connection section may comprise a reduced material thickness in a section between the first leg and the head section. The connection section may comprise a reduced material thickness in a section between the second leg and the head section. The section with reduced material thickness may be used to provide a spring-like behavior of the connection section.

The frame unit may comprise several connection sections which are arranged at a distance in the circumferential direction of the first frame opening or the second frame opening.

If the first frame section and the second frame section are compressed by a clapping force, at least a part of the camping force may be redirected. The clamping force may be partially transferred to connection sections, particularly to the head section. Thus, at least a part of the camping force may be redirected in a radial direction which may be substantially oriented transversely to the camping force acting on the first frame section and the second frame section.

The first frame section, the second frame section and the connection section are at least partially arranged within the sealing body.

The frame unit may be inserted into the sealing body. The sealing element or the sealing body may comprise at least one integrally molded in or molded in frame unit. The frame unit may be at least partially overmolded. The frame unit may be at least partially overmolded by the sealing body or by the sealing body material. The frame unit may be an insert molded part of the sealing element.

At least a part of the frame unit may be arranged in the first section of the sealing body. At least a part of connection section may be arranged in the second section of the sealing body.

Further important features and advantages of the present disclosure emerge from the dependent claims, from the drawings and from the associated description of the figures with reference to the drawings.

It goes without saying that the features mentioned above and those which have yet to be explained below can be used not only in the respectively stated combination, but also in different combinations or on their own without departing from the scope of the present disclosure.

Preferred examples of the present disclosure are illustrated in the drawings and are explained in more detail in the description below, wherein the same reference signs refer to identical or similar or functionally identical components.

DETAILED DESCRIPTION OF THE DRAWINGS

Figure 1:
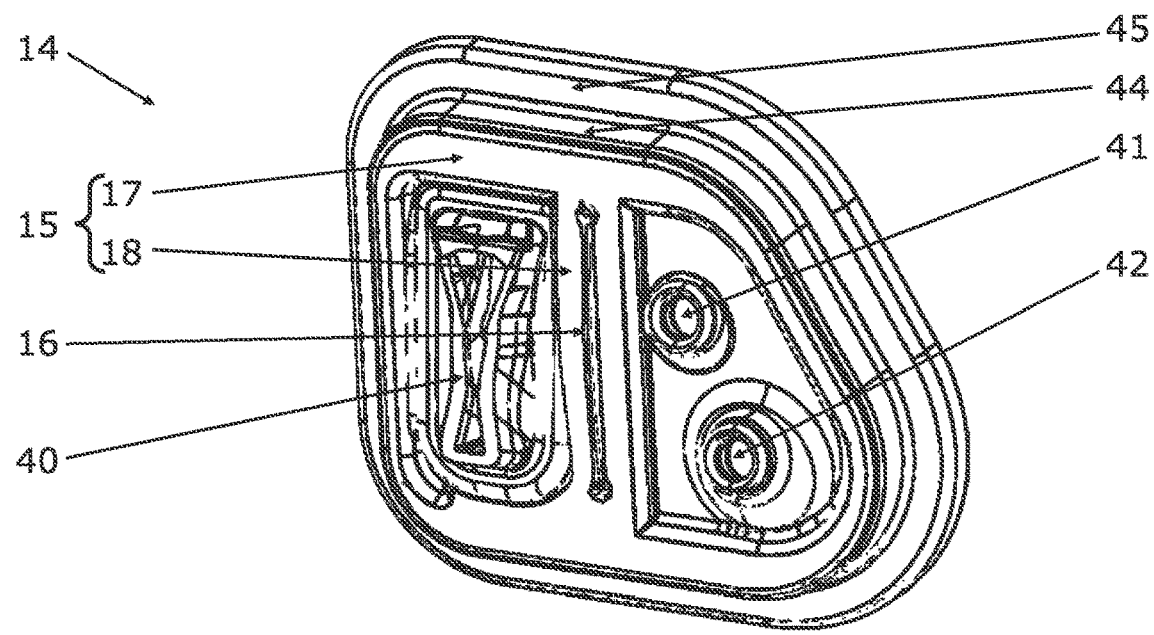
FIG. 1 shows a first perspective view of a sealing element according to the present disclosure.
Figure 2:
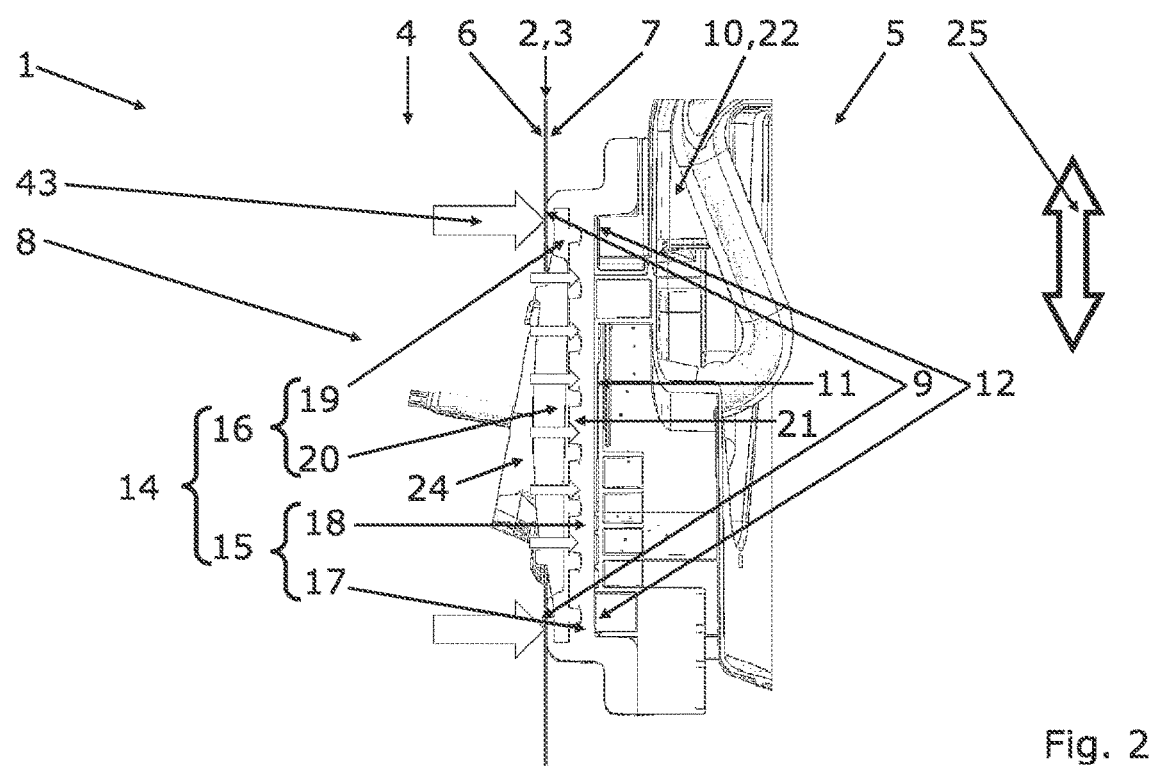
FIG. 2 shows a sectional view of an arrangement according to the present disclosure.

FIG. 1 shows a sealing element 14 for an arrangement 1 for sealing functional unit interfaces 2 in a vehicle which is shown in FIG. 2. The sealing element 14 comprises at least one sealing body 15 and at least one support element 16. The sealing body 15 has a first section 17 which encloses a second section 18 of the sealing body 15. At least the first section 17 of the sealing body 15 may be at least partially clamped between a clamping section 9 and a counter-clamping section 12 of the arrangement 1 shown in FIG. 2.

The support element 16 is at least partially arranged within the sealing body 15.

As shown in FIG. 2, at least a first section 19 of the support element 16 is at least partially arranged in the first section 17 of the sealing body 15 and at least a second section 20 of the support element 16 is at least partially arranged in the second section 18 of the sealing body 15. At least a subsection 21 of the second section 18 of sealing body 15 may be clamped between the support element 16 and the front face 11 of the arrangement 1.

As shown in FIG. 1, the sealing element 14 comprises a sealing body opening 40 for an expansion valve unit, sealing body opening 41 for a first heater pipe and a sealing body opening 42 for a second heater pipe. The support element 16 is arranged between the sealing body opening 40 and the sealing body openings 41, 42.

The first section 17 may be enclosed by a collar section 44. The collar section 44 is enclosed by a collard edge section 45. The first section 17 of the sealing body 15, the second section 18 of the sealing body 15, the collar section 44 of the sealing body 15 and the collar edge section 45 of the sealing body 15 may be formed as a single piece or as a one piece. The collar section 44 may extend primarily axially from the first section 17 of the sealing body 15 and the collard edge section 45 may extend primarily radially from the first section 17 of the sealing body 15.

FIG. 2 shows a sectional view of an arrangement 1 for sealing functional unit interfaces 2 in a vehicle, wherein the sectional view shows a cross section along a longitudinal extension direction 25 of the support element 16.

The arrangement 1 comprises at least one functional unit interface 2 having at least one partition 3. The partition 3 at least partially separates a first space area 4 and a second space area 5. The partition 3 has a first main surface 6, a second main surface 7 and at least one opening 8. The first main surface 6 is arranged in the first space area 4 and the second main surface 7 is arranged in the second space area 5 and at least one functional unit 10 is arranged at least partially in the second space area 5. The functional unit 10 may be a HVAC module 22. The functional unit 10 may comprise an expansion valve unit 24.

The second main surface 7 has a clamping section 9 enclosing the opening 8.

The functional unit 10 has a front face 11 being arranged at least partially opposite the opening 8 of the functional unit interface 2. The front face 11 has a counter-clamping section 12 being substantially arranged opposite the clamping section 9.

Figure 6:
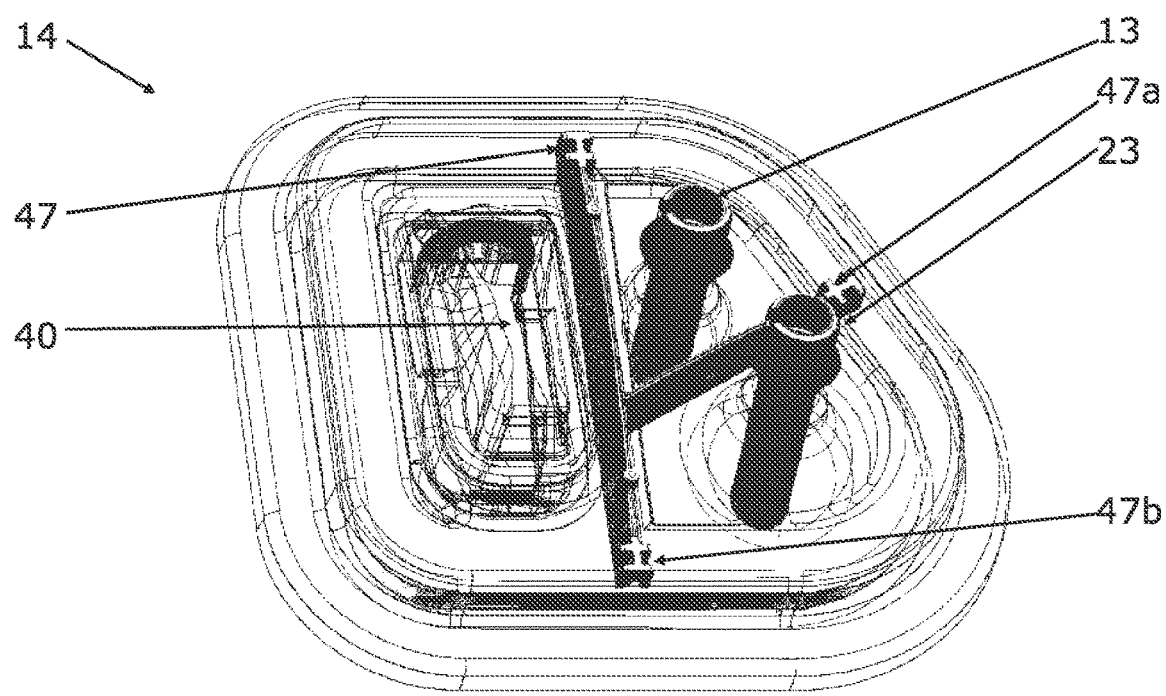
FIG. 6 shows a second perspective view of a sealing element according to the present disclosure.
Figure 7:
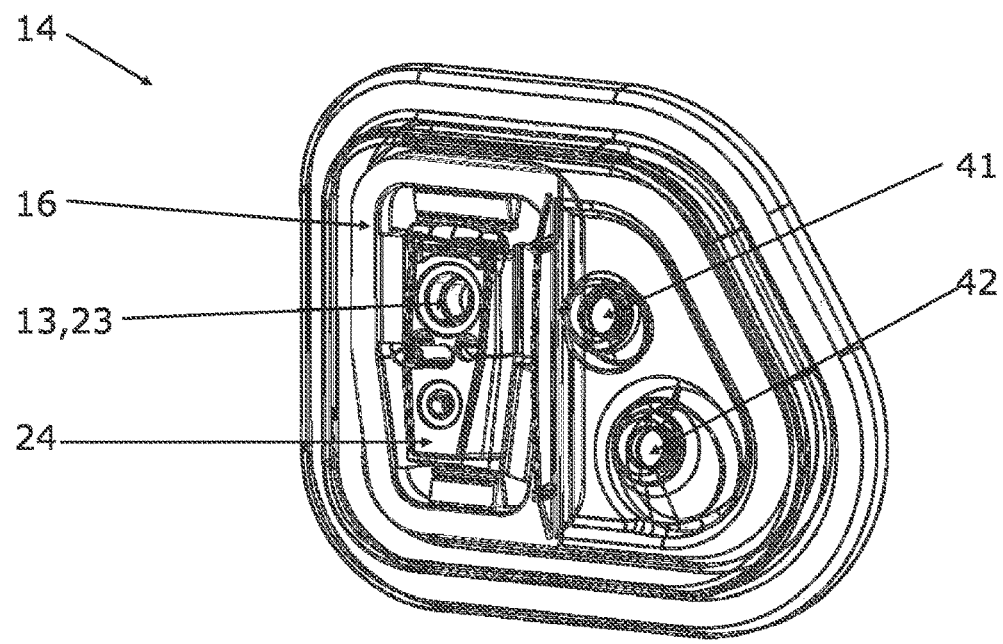
FIG. 7 shows a third perspective view of a sealing element according to the present disclosure.
Figure 8:
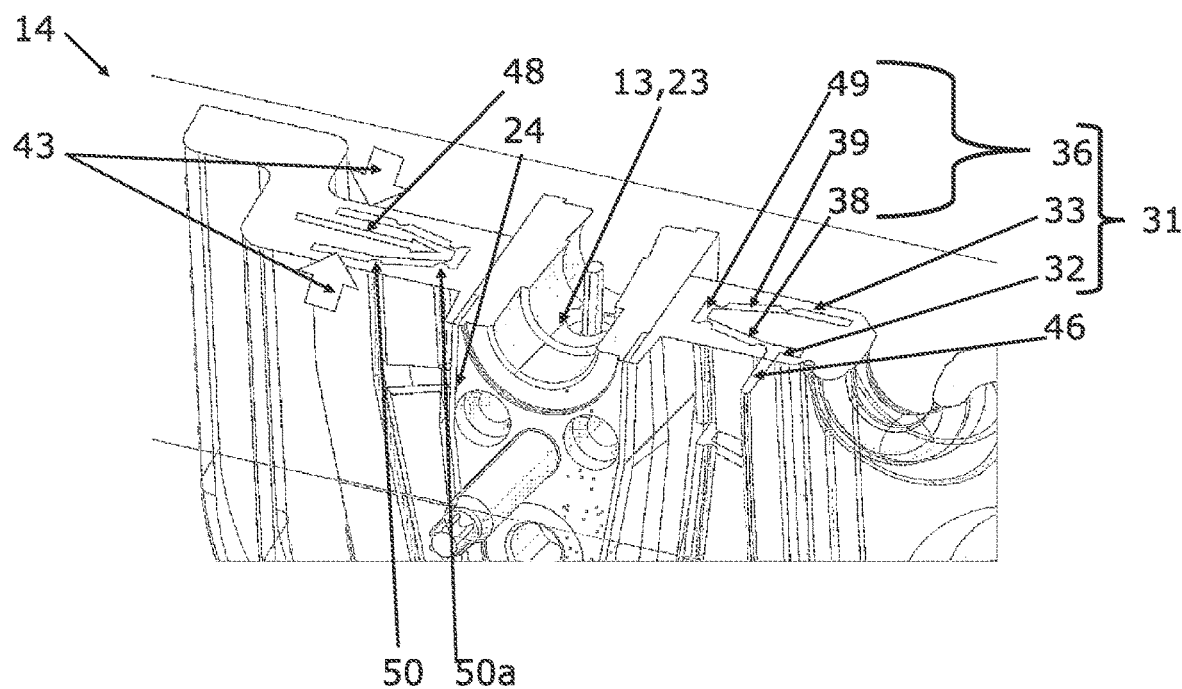
FIG. 8 shows a second sectional view of a sealing element according to the present disclosure.

At least one line 13 is passed from a first space area 4 to the functional unit 10 as shown in FIG. 6 or FIG. 7 or FIG. 8.

The arrangement 1 comprises at least one sealing element 14 with at least one sealing body 15 and at least one support element 16. The sealing body 15 has a first section 17 which encloses a second section 18 of the sealing body 15. At least the first section 17 of the sealing body 15 is at least partially clamped between the clamping section 9 and the counter-clamping section 12. The opening 8 is closed by the second section 18 of sealing body 15 which is at least partially arranged between the opening 8 and the front face 11. The support element 16 is at least partially arranged within the sealing body 15. At least a first section 19 of the support element 16 is at least partially arranged in the first section 17 of the sealing body 15 and at least a second section 20 of the support element 16 is at least partially arranged in the second section 18 of the sealing body 15. At least a subsection 21 of the second section 18 of sealing body 15 is clamped between the support element 16 and the front face 11.

The sealing element 14 comprises an imbedded structure which is formed by the support element 16 distributing a sealing force 43 or clamping force 43 along the sealing element 14. In particular, the support element 16 distributing a sealing force 43 or clamping force 43 along a part of the second section 18 of the sealing body 15.

Figure 3:
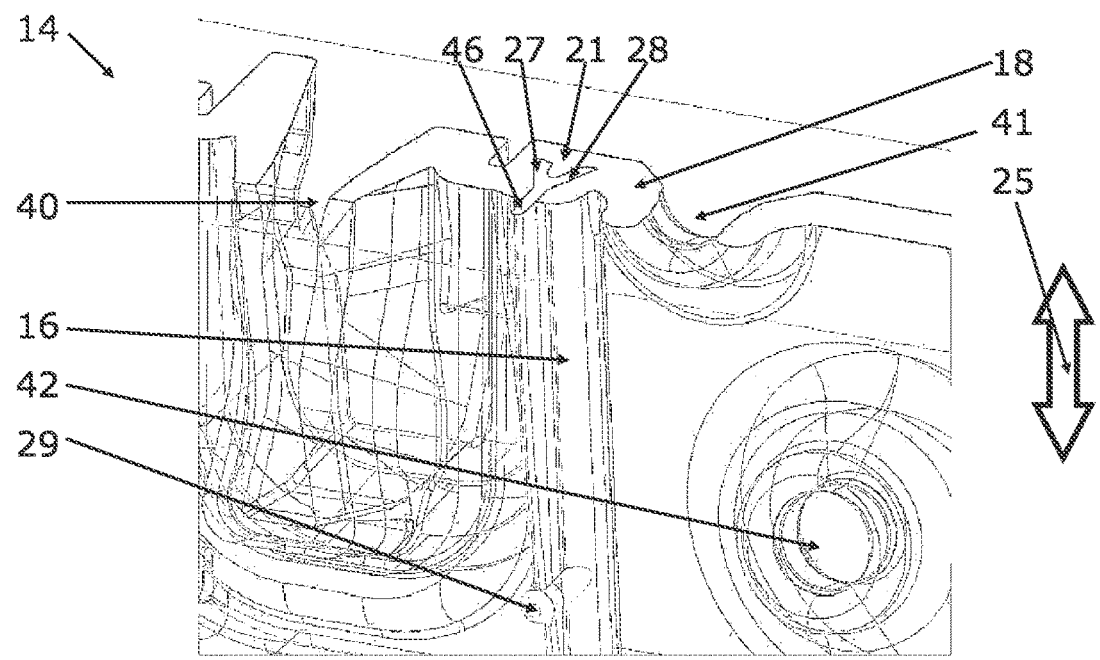
FIG. 3 shows a first sectional of a sealing element according to the present disclosure.

FIG. 3 shows a sectional view of a sealing element 14, wherein the sectional view shows a cross section transversely to a longitudinal extension direction 25 of the support element 16.

The sealing element 14 comprises a sealing body opening 40 for an expansion valve unit, sealing body opening 41 for a first heater pipe and a sealing body opening 42 for a second heater pipe. The support element 16 is arranged between the sealing body opening 40 and the sealing body openings 41, 42.

The support element 16 has at least one positioning pin 29 being at least partially arranged outside of the sealing body 15, particularly outside of the second section 18 of the sealing body 15.

The support element 16 has a generally Y-shaped cross-section transverse to the longitudinal extension direction 25 of the support element 16. The support element 16 with Y-shaped cross-section has three legs of which one leg forms a longitudinal element 46 of the support element 16 being arranged at least partially outside of the sealing body 15. Two legs 27 and 28 of the support element 16 with Y-shaped cross-section are arranged completely or mostly in the sealing body 15, particularly in the second section 18 of the sealing body 15. The legs 27 and 28 are at least partially in contact with the subsection 21 of the second section 18 of the sealing body 15.

Figure 4:
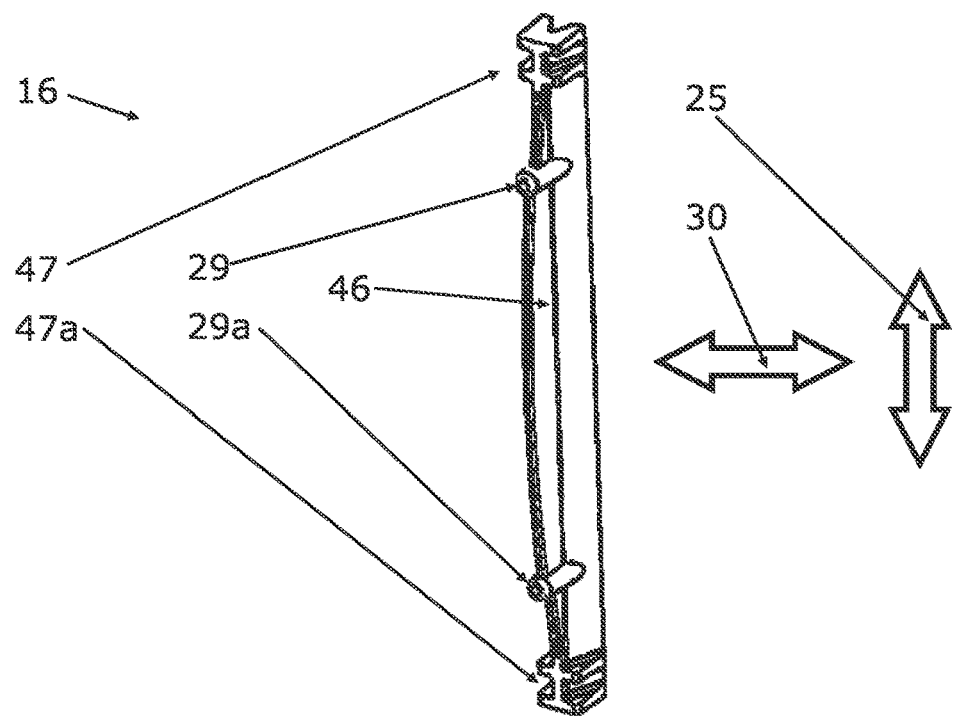
FIG. 4 shows a first perspective view of a support element according to the present disclosure.

FIG. 4 shows a perspective front view of a support element 16. The support element 16 is substantially mirror symmetric to a transverse axis 30 of the support element 16 which is aligned transverse to a longitudinal extension direction 25 of the support element 16. The support element 16 has a first fastening profile 47 for positive connection and a second fastening profile 47a for positive connection. The first fastening profile 47 and the second fastening profile 47a are space apart along the longitudinal extension direction 25 of the support element 16. The first fastening profile 47 or the second fastening profile 47a may have a T-like or a double-T-like structure. The support element 16 has a first positioning pin 29 and a second positioning pin 29a. The first positioning pin 29 and the second positioning pin 29a are space apart along the longitudinal extension direction 25 of the support element 16. The longitudinal element 46 of the support element 16 extends at least partially along the longitudinal extension direction 25 of the support element 16. The longitudinal element 46 of the support element 16 is at least partially arranged between the first fastening profile 47 and the second fastening profile 47a. The longitudinal element 46 of the support element 16 is at least partially arranged between the first positioning pin 29 and the second positioning pin 29a.

Figure 5:
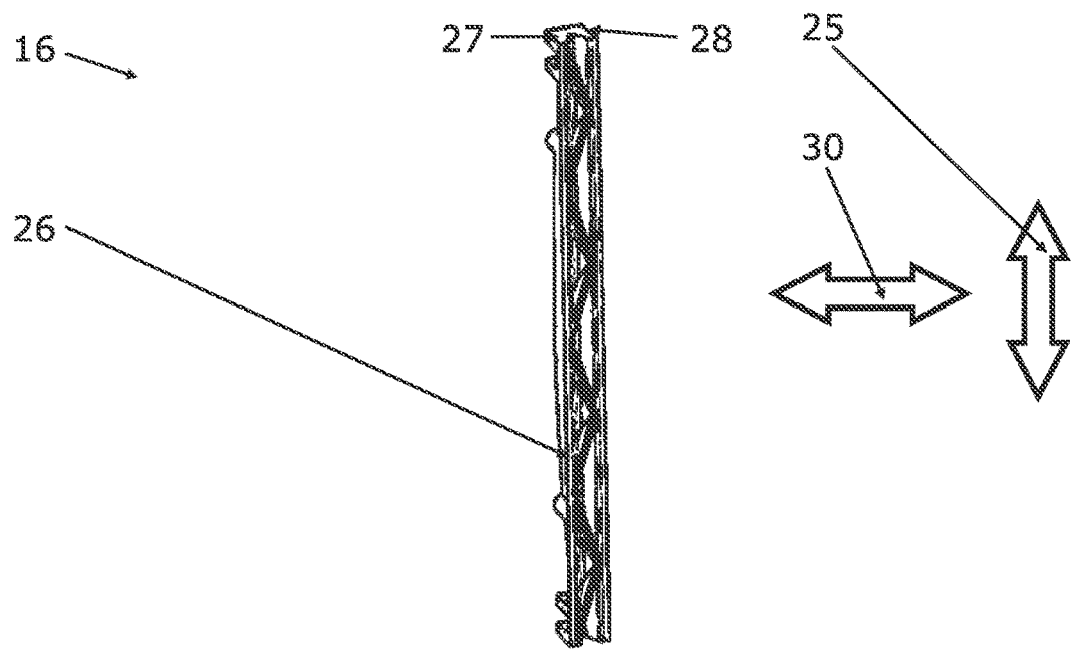
FIG. 5 shows a second perspective view of a support element according to the present disclosure.

FIG. 5 shows a perspective rear view of a support element 16. The Y-shaped support element 16 comprises a reinforcement structure 26 being at least partially arranged between two legs 27 28 of the support element 16.

FIG. 6 shows a perspective view of a sealing element 14 with a support element 16 which comprises several first sections each forming a fastening profile 47, 47a and 47b which are spaced apart and which are at least partially arranged in the first section 17 of the sealing body 15. The sealing element 14 comprises a sealing body opening 40 for an expansion valve unit and two additional sealing body opening through which a line 13 and a fluid line 23 are passed. The support element 16 extends between the sealing body opening 40 and the line 13. The support element 16 extends between the sealing body opening 40 and the fluid line 23. The support element 16 extends between the line 13 and the fluid line 23.

FIG. 7 shows a perspective view of a sealing element 14 with a support element 16 and an expansion valve unit which is inserted in a sealing body opening. The expansion valve unit 24 comprises at least one line 13 or at least one fluid line 23.

Figure 9:
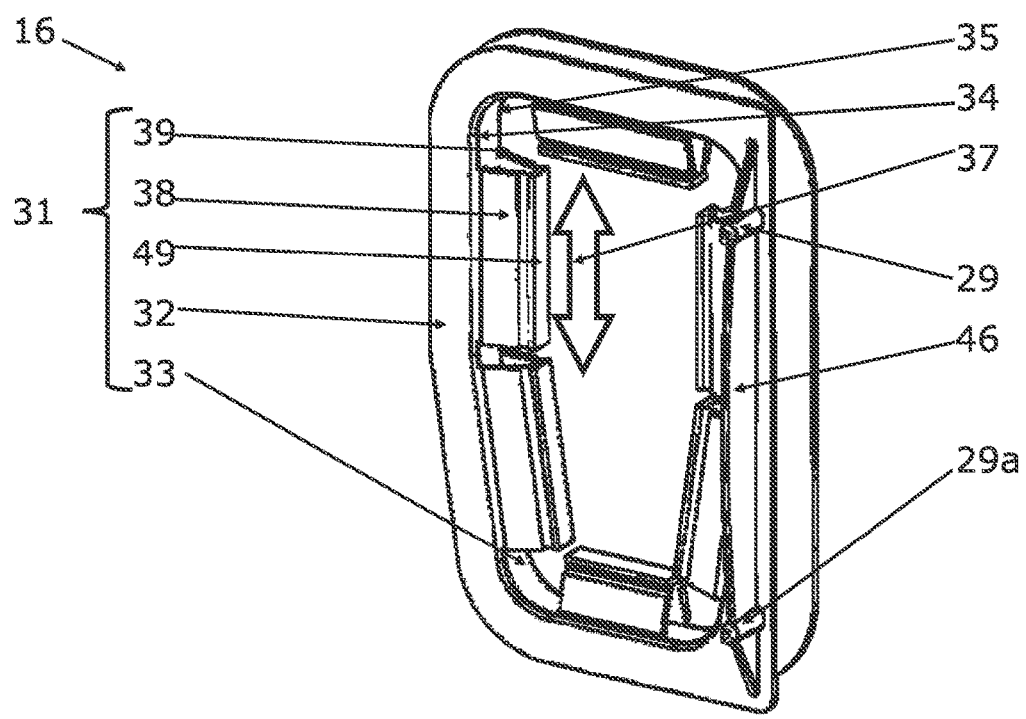
FIG. 9 shows a perspective view of a support element with frame unit according to the present disclosure.

FIG. 8 shows a sectional view of a sealing element 14 of FIG. 7. A perspective view of the support element 16 is shown in FIG. 9.

The support element 16 comprises or forms a frame unit 31 with at least a first frame section 32 and a second frame section 33. The first frame section 32 and the second frame section 33 are spaced apart. The first frame section 32 defines a first frame opening 34 and the second section 33 defines a second frame opening 35. The first frame opening 34 is substantially arranged opposite the second frame opening 35.

The first frame section 32 and a second frame section 33 are connected by at least one connection section 36. The connection section 36 has a generally V-shaped cross-section transverse to a longitudinal extension direction 37 of the connection section 36. A first leg 38 of the V-shaped connection section 36 is connected to the first frame section 32 and a second leg 39 of the V-shaped connection section 36 is connected to the second frame section 33. The first frame section 32, the second frame section 33 and the connection section 36 are at least partially arranged within the sealing body 15.

An end of the first leg 38 and end of the second leg 39 on the opposite side of the first frame section 32 or second frame section 33 may be connected by a head section 49. The head section 49 may be arranged transversely to the first frame section 32 or second frame section 33.

The frame unit 31 may comprise several connection sections 36 which are arranged at a distance in the circumferential direction of the first frame opening 34 or the second frame opening 35.

If the first frame section 32 and the second frame section 33 are compressed by a clapping force 43, at least a part of the camping force 43 may be redirected. The clamping force 43 may be partially transferred to connection sections 36, particularly to the head section 49. Thus, at least a part of the camping force 43 may be redirected in a radial direction 48 which may be substantially oriented transversely to the camping force 43 which is acting on the first frame section 32 and the second frame section 33.

The functional unit 10 comprises at least one expansion valve unit 24 which is at least partially arranged within the first frame opening 34 and the second frame opening 35. The redirected camping force 43 along the radial direction 48 may be used to improve the sealing of the expansion valve unit 24.

The connection section 36 may comprise a reduced material thickness in a section 50 between the first leg 38 and the first frame section 32. The connection section 36 may comprise a reduced material thickness in a section between the second leg 39 and the second frame section 33. The connection section 36 may comprise a reduced material thickness in a section 50*a* between the first leg 38 and the head section 49. The connection section 36 may comprise a reduced material thickness in a section between the second leg 39 and the head section 49.

The first frame section 32 may form a longitudinal element 46 of the support element 16 may be arranged at least partially outside of the sealing body 15. The first frame section 32 may form a first positioning pin 29 and a second positioning pin 29*a*. The first positioning pin 29 and the second positioning pin 29*a* may be arranged at least partially outside of the sealing body 15. The longitudinal element 46 of the support element 16 may be at least partially arranged between the first positioning pin 29 and the second positioning pin 29*a*.

The subsequent claims, in particular the features of these claims or the description of these claims, may be combined without leaving the scope of the present disclosure. All embodiments resulting from the aforementioned combinations and from the following combinations are herewith disclosed.

For example, claim 1 can be combined with claim 2, 3, 4, 5, 6, 7, 8, 9, 10, 11, 12, 13, 14, 15, 16 or 17.
For example, claim 2 can be combined with claim 1, 3, 4, 5, 6, 7, 8, 9, 10, 11, 12, 13, 14, 15, 16 or 17.
For example, claim 3 can be combined with claim 1, 2, 4, 5, 6, 7, 8, 9, 10, 11, 12, 13, 14, 15, 16 or 17.
For example, claim 4 can be combined with claim 1, 2, 3, 5, 6, 7, 8, 9, 10, 11, 12, 13, 14, 15, 16 or 17.
For example, claim 5 can be combined with claim 1, 2, 3, 4, 6, 7, 8, 9, 10, 11, 12, 13, 14, 15, 16 or 17.
For example, claim 6 can be combined with claim 1, 2, 3, 4, 5, 7, 8, 9, 10, 11, 12, 13, 14, 15, 16 or 17.
For example, claim 7 can be combined with claim 1, 2, 3, 4, 5, 6, 8, 9, 10, 11, 12, 13, 14, 15, 16 or 17.
For example, claim 8 can be combined with claim 1, 2, 3, 4, 5, 6, 7, 9, 10, 11, 12, 13, 14, 15, 16 or 17.
For example, claim 9 can be combined with claim 1, 2, 3, 4, 5, 6, 7, 8, 10, 11, 12, 13, 14, 15, 16 or 17.
For example, claim 10 can be combined with claim 1, 2, 3, 4, 5, 6, 7, 8, 9, 11, 12, 13, 14, 15, 16 or 17.
For example, claim 11 can be combined with claim 1, 2, 3, 4, 5, 6, 7, 8, 9, 10, 12, 13, 14, 15, 16 or 17.
For example, claim 12 can be combined with claim 1, 2, 3, 4, 5, 6, 7, 8, 9, 10, 11, 13, 14, 15, 16 or 17.
For example, claim 13 can be combined with claim 1, 2, 3, 4, 5, 6, 7, 8, 9, 10, 11, 12, 14, 15, 16 or 17.
For example, claim 14 can be combined with claim 1, 2, 3, 4, 5, 6, 7, 8, 9, 10, 11, 12, 15, 16 or 17.
For example, claim 15 can be combined with claim 1, 2, 3, 4, 5, 6, 7, 8, 9, 10, 11, 12, 14, 16 or 17.
For example, claim 16 can be combined with claim 1, 2, 3, 4, 5, 6, 7, 8, 9, 10, 11, 12, 14, 15 or 17.
For example, claim 17 can be combined with claim 1, 2, 3, 4, 5, 6, 7, 8, 9, 10, 11, 12, 14, 15 or 16.

What is claimed is:

1. An arrangement (1) for sealing functional unit interfaces (2) in a vehicle, the arrangement comprising:
    a functional unit, a functional unit interface, and a sealing element,
    wherein the functional unit interface (2) has a partition (3), the partition (3) at least partially separating a first space area (4) and a second space area (5),
    wherein the partition (3) has a first main surface (6), a second main surface (7), and an opening (8), the second main surface (7) having a clamping section (9) enclosing the opening (8),
    wherein the first main surface (6) is arranged in the first space area (4), the second main surface (7) is arranged in the second space area (5), and the functional unit (10) is arranged at least partially in the second space area (5),
    wherein the functional unit (10) has a front face (11) arranged at least partially opposite the opening (8) of the functional unit interface (2),
    wherein the front face (11) has a counter-clamping section (12) opposite the clamping section (9),
    wherein a line (13) extends from the first space area (4) to the functional unit (10),
    wherein the sealing element (14) has a sealing body (15) and a support element (16), the sealing body (15) having a first section (17) which encloses a second section (18) of the sealing body (15),
    wherein the first section (17) of the sealing body (15) is at least partially clamped between the clamping section (9) and the counter-clamping section (12),
    wherein the opening (8) is closed by the second section (18) of sealing body (15) which is at least partially arranged between the opening (8) and the front face (11),
    wherein the support element (16) is at least partially arranged within the sealing body (15),
    wherein a first section (19) of the support element (16) is at least partially arranged in the first section (17) of the sealing body (15) and a second section (20) of the support element (16) is at least partially arranged in the second section (18) of the sealing body (15),
    wherein at least a subsection (21) of the second section (18) of sealing body (15) is clamped between the support element (16) and the front face (11), the support element (16) being made of a first material and the sealing body (15) being made of a second material.

2. The arrangement (1) according to claim 1,
    wherein the partition (3) is at least partially made of a metallic material,
    wherein the sealing body (15) is at least partially made of a foam-like or a rubber material, and
    wherein the support element (16) is at least partially made of a solid material.

3. The arrangement (1) according to claim 1, wherein the functional unit (10) is at least partially a heating, ventilation, and air-conditioning module (HVAC module) (22) and the line (13) is a fluid line (23).

4. The arrangement according to claim 3, wherein the HVAC module (22) comprises an expansion valve unit (24) which is at least partially sealed by the sealing element (14).

5. The arrangement (1) according to claim 1, wherein the support element (16) has a Y-shaped cross-section transverse to a longitudinal extension direction (25) of the support element (16).

6. The arrangement (1) according to claim 5, wherein the Y-shaped cross-section of the support element (16) comprises a reinforcement structure (26) being at least partially arranged between two legs (27,28) of the support element (16), the reinforcement structure (26) being arranged within the sealing body (15).

7. The arrangement (1) according to claim 1, wherein the support element (16) has a positioning pin (29) being at least partially arranged outside of the sealing body (15).

8. The arrangement (1) according to claim 1, wherein the support element (16) is mirror symmetric to a transverse axis (30) of the support element (16), which is aligned transverse to a longitudinal extension direction (25) of the support element (16).

9. The arrangement (1) according to claim 1,
wherein the support element (16) comprises a frame unit (31) with at least a first frame section (32) and a second frame section (33),
wherein the first frame section (32) and the second frame section (33) are spaced apart,
wherein the first frame section (32) defines a first frame opening (34) and the second section (33) defines a second frame opening (35),
wherein the first frame opening (34) being arranged opposite the second frame opening (35),
wherein the first frame section (32) and a second frame section (33) are connected by connection section (36),
wherein the connection section (36) has a V-shaped cross-section transversely to a longitudinal extension direction (37) of the connection section (36),
wherein a first leg (38) of the V-shaped cross-section of the connection section (36) is connected to the first frame section (32),
wherein a second leg (39) of the V-shaped cross-section of the connection section (36) is connected to the second frame section (33),
wherein the first frame section (32), the second frame section (33) and the connection section (36) are at least partially arranged within the sealing body (15).

10. The arrangement (1) according to claim 9, wherein the functional unit (10) comprises a expansion valve unit (24) which is at least partially arranged within the first frame opening (34) and the second frame opening (35).

11. A sealing element (14) for a sealing arrangement (1), the sealing element (14) comprising a sealing body (15) and a support element (16), the sealing body (15) having a first section (17) enclosing a second section (18) of the sealing body (15), at least the first section (17) of the sealing body (15) being configured to be at least partially clamped between the clamping section (9) and the counter-clamping section (12) of the arrangement (1),
wherein the sealing element is configured to close an opening (8) of the arrangement (1) by the second section (18) of sealing body (15), when the sealing body is at least partially arranged between the opening (8) and a front face (11) of the arrangement (1),
wherein the support element (16) is at least partially arranged within the sealing body (15),
wherein a first section (19) of the support element (16) is at least partially arranged in the first section (17) of the sealing body (15) and a second section (20) of the support element (16) is at least partially arranged in the second section (18) of the sealing body (15),
wherein at least a subsection (21) of the second section (18) of the sealing body (15) is configured to be clamped between the support element (16) and the front face (11) of the arrangement (1), the support element (16) being made of a first material and the sealing body (15) being made of a second material.

12. The sealing element (14) according to claim 11, wherein the sealing body (15) is at least partially made of foam-like or rubber material and the support element (16) is at least partially made of solid material.

13. The sealing element (14) according to claim 11, wherein the support element (16) has a Y-shaped cross-section transverse to a longitudinal extension direction (25) of the support element (16).

14. The sealing element (14) according to claim 13, wherein the Y-shaped cross-section of the support element (16) comprises a reinforcement structure (26) being at least partially arranged between two legs (27,28) of the support element (16), the reinforcement structure (26) being arranged within the sealing body (15).

15. The sealing element (14) according to claim 11, wherein the support element (16) has a positioning pin (29) being at least partially arranged outside of the sealing body (15).

16. The sealing element (14) according to claim 11, wherein the support element (16) is mirror symmetric to a transverse axis (30) of the support element (16) which is aligned transverse to a longitudinal extension direction (25) of the support element (16).

17. The sealing element (14) according to claim 11,
wherein the support element (16) comprises a frame unit (31) with at least a first frame section (32) and a second frame section (33),
wherein the first frame section (32) and the second frame section (33) are spaced apart,
wherein the first frame section (32) defines a first frame opening (34) and the second section (33) defines a second frame opening (35), the first frame opening (34) being arranged opposite the second frame opening (35),
wherein the first frame section (32) and a second frame section (33) are connected by a connection section (36),
wherein the connection section (36) has a V-shaped cross-section transverse to a longitudinal extension direction (37) of the connection section (36),
wherein a first leg (38) of the V-shaped cross-section of the connection section (36) is connected to the first frame section (32),
wherein a second leg (39) of the V-shaped cross-section of the connection section (36) is connected to the second frame section (33), and
wherein the first frame section (32), the second frame section (33) and the connection section (36) are at least partially arranged within the sealing body (15).

* * * * *